United States Patent [19]

Abe et al.

[11] Patent Number: 4,938,910

[45] Date of Patent: Jul. 3, 1990

[54] MANDREL FOR PRODUCTION OF RUBBER HOSE

[75] Inventors: Shunji Abe; Hiromi Shigemoto, both of Iwakuni, Japan

[73] Assignee: Mitsui Petrochemical Industries, Ltd., Tokyo, Japan

[21] Appl. No.: 195,358

[22] Filed: May 16, 1988

Related U.S. Application Data

[63] Continuation of Ser. No. 629,558, Jul. 10, 1984, abandoned.

[30] Foreign Application Priority Data

Jul. 11, 1983 [JP] Japan ................... 58-124657

[51] Int. Cl.$^5$ ............. C08L 23/20; B29C 41/08; B29C 41/12; B29C 71/02
[52] U.S. Cl. ................... 264/236; 156/195; 525/240; 524/490
[58] Field of Search ............ 525/240; 524/490

[56] References Cited

U.S. PATENT DOCUMENTS

| | | | |
|---|---|---|---|
| 3,458,604 | 7/1969 | Palmer | 525/240 |
| 3,544,662 | 12/1970 | Polestak et al. | 525/240 |
| 3,692,712 | 9/1972 | Crouch et al. | 525/240 |
| 3,880,952 | 4/1975 | Brockman | 525/240 |
| 4,166,057 | 8/1979 | Takemori | 525/240 |

FOREIGN PATENT DOCUMENTS

| | | | |
|---|---|---|---|
| 396782 | 2/1979 | France . | |
| 53-3098353 | 8/1978 | Japan . | |
| 54-014454 | 1/1979 | Japan . | |
| 55-39855 | 3/1980 | Japan . | |
| 184871 | 3/1970 | United Kingdom . | |
| 253833 | 11/1971 | United Kingdom . | |
| 1253833 | 11/1971 | United Kingdom | 525/240 |

OTHER PUBLICATIONS

Chemical Abstracts, vol. 77, No. 24, Dec. 11, 1972, p. 50, No. 153251x, Columbus, Ohio, U.S.A.; & JP-A-72 14712 (Furukawa Electric Co., Ltd.), 02-05-1972.

*Primary Examiner*—Carman J. Seccuro
*Attorney, Agent, or Firm*—Cushman, Darby & Cushman

[57] ABSTRACT

A mandrel suitable for use in the production of a rubber hose formed from a composition comprising:

(i) at least one member selected from the group consisting of (A) an ethylene-alpha-olefin random copolymer having an ethylene content of 10 to 95 mol % and a degree of crystallinity, based on X-ray determination, of 0 to 20%, (B) a propylene - $C_4$ to $C_{10}$ alpha-olefin random copolymer having a propylene content of 50 to 80 mol % and a crystal fusion heat amount, determined by a differential scanning calorimeter, of 0 to 80 Joule/g, and (C) an oligomer having the general formula:

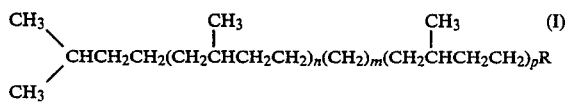

wherein n and p are independently zero or an integer, m is zero or 1, and R is

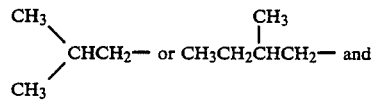

and (ii) 98% to 30% by weight of a 4-methyl-1-pentene polymer, wherein the weight ratio of the component (i) to the component (ii) is from 2:98 to 70:30.

This mandrel has excellent dimensional stability, durability, heat resistance, and releasability.

7 Claims, 1 Drawing Sheet

MANDREL FOR PRODUCTION OF RUBBER HOSE

This is a continuation of application Ser. No. 629,558, filed July 10, 1984, now abandoned.

BACKGROUND OF THE INVENTION

1. Field of the Invention

The present invention relates to a mandrel suitable for use in the production of a rubber hose, more particularly to a mandrel having excellent dimensional stability, durability, heat resistance, and releasability.

2. Description of the Prior Art

Various vulcanized rubber hoses such as water hoses and heater hoses are generally produced by the following steps (I) to (VIII), shown in FIG. 1.

(I) An unvulcanized rubber coated mandrel assembly 10 is formed by melt-coating an unvulcanized rubber compound 12, by using an extruder 13, on a mandrel 11 having the same diameter as that of the desired rubber hose (alternatively, an unvulcanized rubber sheet may be wound on the surface of the mandrel 11 instead of the melt coating);

(II) As an optional step, a knitted fiber sheet 14 is applied on the surface of the rubber compound coated mandrel assembly 10 in a knitting machine 15 for reinforcing the desired vulcanized rubber;

(III) Unvulcanized rubber compound 12', which may be the same as or different from the unvulcanized rubber compound 12, is further coated on the knitted fiber sheet coating 14 by using an extruder 16, if the above-mentioned step (II) is used;

(IV) The unvulcanized rubber coating or sheet 17 on the mandrel obtained in the step (I) or (III) is coated with lead in a conventional lead coating machine 18 for preventing deformation of the outer diameter of the hose (this lead coating may be omitted or replaced with a high-melting point resin coating);

(V) mandrel 19 with the unvulcanized rubber and lead is wound up to obtain an unvulcanized rubber assemble 20;

(VI) The unvulcanized rubber assemble 20 thus obtained is vulcanized by heating at 130° C. to 180° C. with, for example, a pressurized steam 23 in a vulcanization apparatus 21 such as vulcanizer (the unvulcanized rubber assemble may be directly fed to a continuous vulcanizer without winding up in the step (V);

(VII) After the vulcanization, the cover (e.g., lead) is removed from the vulcanized product in a cover releasing step 24; and (VIII) The mandrel 11 is pulled out from the resultant vulcanized rubber hose product 25 by passing a pressurized gas or fluid 26 between the rubber hose and the mandrel.

The mandrels used as a core in the above-mentioned production steps of the rubber hose must have sufficient flexibility to be readily wound up and have sufficient heat resistance to resist a high temperature during vulcanization. Furthermore, the mandrels must have excellent releasability to allow ready removal from the rubber hose during the release step and to provide a fine finish on the released surface of the rubber hose. Furthermore, the mandrels are required to possess, in addition to the above-mentioned characteristics, dimensional stability sufficient not to cause error in the diameter due to shrinkage or elongation of the mandrel and durability sufficient to be repeatedly used many times.

Heretofore, mandrels are generally manufactured from polyamides such as nylon. However, these conventional mandrels have problems in that the flexibility is not sufficient, shrinkage or elongation is caused after repeated use several times to result in dimension problems, and the durability is not sufficient due to, for example, the decrease in the mechanical strength. For these reasons, conventional mandrels can be used repeatedly only two or three times.

SUMMARY OF THE INVENTION

Accordingly, the objects of the present invention are to eliminate the above-mentioned problems in the prior art and to provide a mandrel, suitable for use in the production of a rubber hose, having excellent dimensional stability, durability, heat resistance, and releasability.

Other objects and advantages of the present invention will be apparent from the following description.

In accordance with the present invention, there is provided a mandrel suitable for use in the production of a rubber hose formed from a composition comprising: (i) at least one member selected from the group consisting of (A) an ethylene-alpha-olefin random copolymer having an ethylene content of 10 to 95 mol % and a degree of crystallinity, based on X-ray determination, of 0 to 20%, (B) a propylene-$C_4$ to $C_{10}$ alpha-olefin random copolymer having a propylene content of 50 to 80 mol % and a crystal fusion heat amount, determined by a differential scanning calorimeter, of 0 to 80 Joule/g, and (C) an oligomer having the general formula:

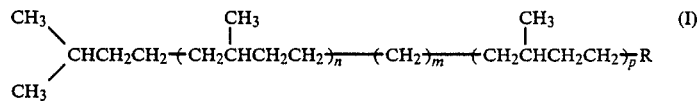

wherein n and p are independently zero or an integer, m is zero or 1, and R is

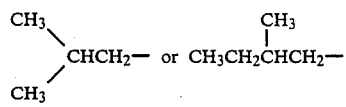

and (ii) 4-methyl-1-pentene polymer, wherein the weight ratio of the component (i) to the component (ii) is from 2:98 to 70:30.

BRIEF DESCRIPTION OF THE DRAWING

The present invention will be better understood from the description set forth below with reference to the accompanying drawing of FIG. 1, in which steps for production of a vulcanized rubber hose are schematically illustrated.

DESCRIPTION OF THE PREFERRED EMBODIMENT

Figure 1:
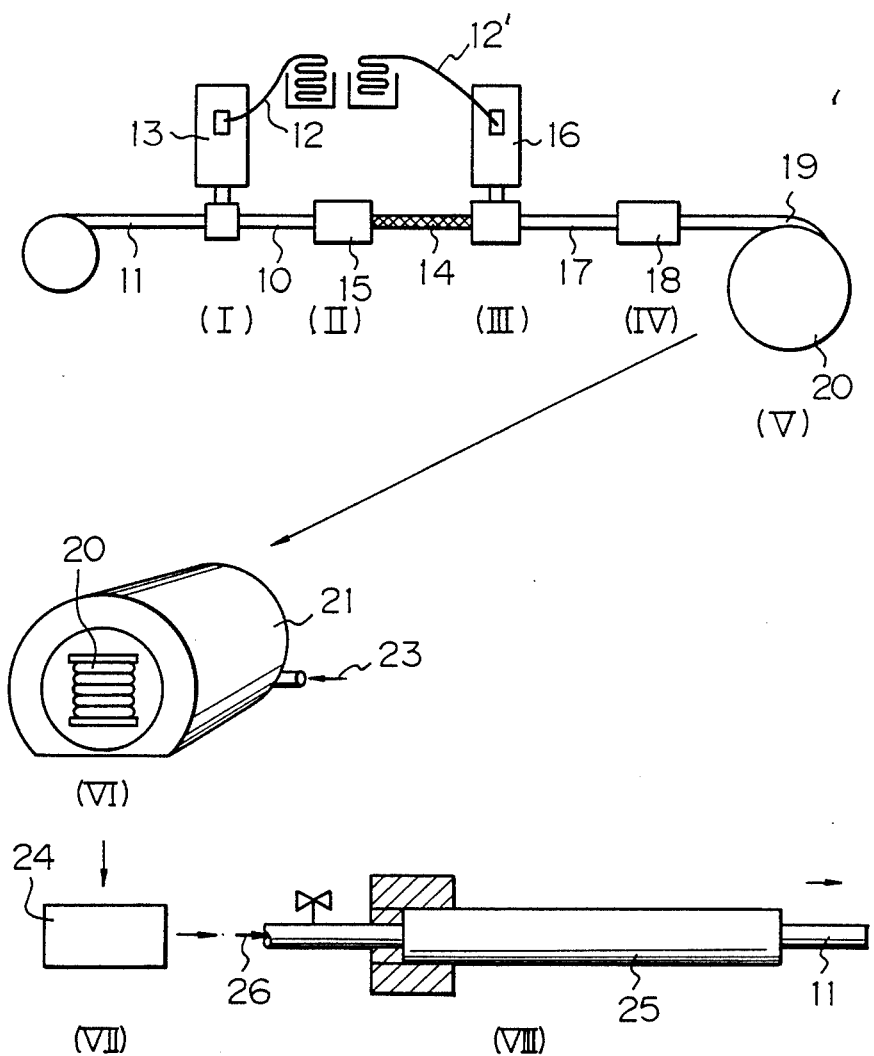

The ethylene-alpha-olefin random copolymers (A) usable as the component (i) in the present invention are those having an ethylene content of 10 to 95 mol %, preferably 40 to 92 mol % and a degree of crystallinity, based on X-ray determination, of 0 to 20%, preferably 0 to 15%.

Ethylene-alpha-olefin random copolymers other than the above-specified random copolymers are not desirable for the reasons that mandrels made of those copolymers and 4-methyl-1-pentene polymer have poor heat resistance or poor releasability since the mandrels become sticky.

The alpha-olefins usable as a comonomer in the preparation of the ethylene-alpha-olefin copolymers are typically alpha-olefins having 3 to 10 carbon atoms such as propylene, 1-butene, 4-methyl-1-pentene, 1-hexene, 1-octene, and 1-decene. These alpha-olefins can be used alone or in any mixture thereof.

The preferable ethylene-alpha-olefin random copolymers are oligomer-like polymers having a narrow molecular weight distribution such as those having a number-average molecular weight (i.e., "Mn") of 300 to 5000, especially 300 to 2000, and a ratio of a weight-average molecular weight (i.e., "Mw") to Mn (i.e., Mw/Mn), which represents a molecular weight distribution, of 3 or less, especially 2 or less. These oligomer-like polymers have preferably good compatibility to 4-methyl-1-pentene polymers.

These narrow molecular weight ethylene-alpha-olefin random copolymers in the form of an oligomer can be prepared by, for example, continuously copolymerizing ethylene and an alpha-olefin in a liquid medium in the presence of hydrogen by using a catalyst formed from a vanadium compound soluble in the liquid medium and an organic aluminum compound. In this method, the vanadium compound in the polymerization mixture is kept at the concentration of 0.3 mmol per 1 liter of the liquid mixture or more during the polymerization and is charged after the vanadium compound is diluted with the polymerization medium in a concentration 5 times or less of that of the reaction mixture.

Examples of such vanadium compounds are those having the general formula of $VO(OR)_nX_{3-n}$ or $VX_4$, wherein R is an aliphatic hydrocarbon group, X is a halogen atom, and $0 \leq n \leq 3$, such as $VOCl_3$, $VO(OC_2H_5)\text{-}Cl_2$, $VO(OC_2H_5)_{1.5}Cl_{1.5}$, or $VCl_4$. These vanadium compounds may be used alone or in any mixture thereof. Examples of organic aluminum compounds are those having the general formula of $R'_mAlX'_{3-m}$, wherein R' is an aliphatic hydrocarbon group, X' is a halogen atom, and $1 \leq m \leq 3$, such as $(C_2H_5)_3Al$, $(C_2H_5)_2AlCl$, $(C_2H_5)_{1.5}\text{-}AlCl_{1.5}$, and $(C_2H_5)ALCL_2$. These organic aluminum compounds may be used alone or in any mixture thereof.

Examples of the polymerization media usable in the above-mentioned copolymerization are hydrocarbons such as pentane, hexane, heptane, kerosine, cyclohexane, and toluene. The concentration of the vanadium compound in the polymerization medium is generally 0.3 mmol/liter or more, preferably 0.5 to 20 mmol/liter. The concentration of the organic aluminum compound is such that an atomic ratio Al/V is generally 2 to 50, preferably 3 to 20. Although there is no critical copolymerization conditions, the copolymerization can be generally carried out under the conditions of a copolymerization temperature of 0° C. to 100° C., preferably 20° C. to 80° C., a pressure of 0 to 50 kg/cm² (gauge), preferably 0 to 30 kg/cm² (gauge), and an average residence time of 5 to 300 minutes, preferably 10 to 250 minutes. The above-mentioned copolymerization method is disclosed in detail in, for example, Japanese Unexamined Patent Publication (Kokai) No. 57-123205.

The propylene-$C_4$ to $C_{10}$ alpha-olefin random copolymers (B) usable as the component (i) in the present invention are random copolymers of propylene and a $C_4$–$C_{10}$ alpha-olefin having a propylene content of 50 to 80 mol %, preferably 60 to 80 mol % and a crystal fusion heat amount, determined by a differential scanning calorimeter, of 0 to 80 Joule/g, preferably 0 to 70 Joule/g.

Propylene-$C_4$ to $C_{10}$ alpha-olefin random copolymers other than the above-specified random copolymers are not desirable for the reasons that these copolymers tend to result in a mandrel having poor heat resistance, mechanical strengths, or releasability.

The propylene-$C_4$ to $C_{10}$ alpha-olefin random copolymers (B) preferably have a melt flow rate, determined by ASTM-D-1238 (L) of 0.1 to 50 g/10 min.

The alpha-olefins usable as a comonomer in the preparation of the propylene-$C_4$ to $C_{10}$ alpha-olefin random copolymers are typically alpha-olefins having 4 to 10 carbon atoms such as 1-butene, 1-pentene, 1-hexene, 4-methyl-1-pentene, 1-octene, and 1-decene. The most preferable alpha-olefin is 1-butene. These alpha-olefins may be used alone or in any mixture thereof.

Furthermore, of these propylene-$C_4$ to $C_{10}$ alpha-olefin random copolymers, the random copolymers having an Mn of 300 to 5000, especially 300 to 2000, and a ratio Mw/Mn of 3 or less, especially 2 or less are preferable due to the good compatibility thereof to 4-methyl-1-pentene polymers.

The propylene-$C_4$ to $C_{10}$ alpha-olefin random copolymers having the above-mentioned preferable properties can be prepared by, for example, random copolymerizing propylene and the alpha-olefin by using a catalyst composed of (a) a complex containing at least magnesium, titanium, and halogen, (b) an organometallic compound of a metal belonging to Group I to III of the periodic table, and (c) an electron donor. Part or all of the electron donor (c) may be supported on at least a portion of the complex (a) or may be previously contacted with the organometallic compound (b) prior to the use thereof. Especially, it is preferable that a portion of the electron donor (c) is supported on the complex (a) and that the remainder is added to the polymerization system or is previously contacted with the organometallic compound. In this preferred case, the electron donor supported on the complex (a) may be the same as or different from that added to the reaction system or contacted with the organometallic compound.

The oligomers (C) usable as the component (i) in the present invention are those having the general formula:

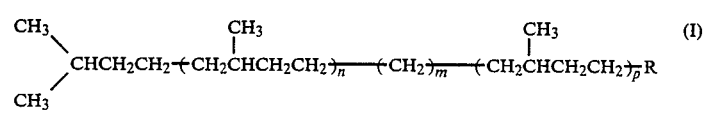

wherein n and p are independently zero or an integer, m is zero or 1, and R is

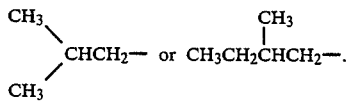

The oligomers having the formula (I), in which m is 0 and R is

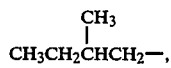

are the hydrogenated products of polyisoprene. These oligomers can be readily prepared by, for example, anion polymerizing isoprene in the presence of a sec-butyl lithium catalyst in cyclohexane, followed by hydrogenation in the presence of a nickel naphthenate catalyst.

Furthermore, the oligomer having the formula (I), in which m is 1, n and p are 2, and R is

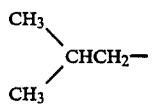

is squalane, which is readily obtained by hydrogenating squalene in the presence of a nickel catalyst. As is well known, the squalene can be obtained from the liver oil of deep-sea sharks. These oligomers may be used alone or in any mixture thereof.

Of these oligomers, those having an Mn of 300 to 5000, especially 300 to 2000 and a ratio Mw/Mn of 3 or less, especially 2 or less are preferable due to the good compatibility thereof to 4-methyl-1-pentene polymers as well as good heat resistance and releasability.

The ethylene content and the propylene content mentioned hereinabove are determined by a $^{13}$C-NMR method. The melting point and the crystal fusion heat amount are determined at a rate of temperature increase of 10° C./min by means of a differential scanning calorimeter (Du Pont type 990). Furthermore, Mn and Mw/Mn are determined at a temperature of 25° C. by means of gel permeation chromatography (GPC) by using tetrahydrofuran as a solvent and polystyrene and squalane each having the known molecular weight as a standard.

The 4-methyl-1-pentene polymers usable as the component (ii) in the present invention are the crystalline homopolymers of 4-methyl-1-pentene and the crystalline copolymers of 85 mol % or more of 4-methyl-1-pentene with 15 mol % or less of the other alpha-olefin or alpha-olefins having 2 to 20 carbon atoms such as, for example, ethylene, propylene, 1-butene, 1-hexene, 1-octene, 1-decene, 1-tetradecene, and 1-octadecene.

As stated, according to the present invention, at least one member of the above-mentioned components (A), (B), and (C) and (ii) the 4-methyl-1-pentene polymer must be blended in a weight ratio of from 2:98 to 70:30, preferably 5:95 to 60:40, and more preferably 5:95 to 50:50 to form the desired mandrel.

When the ratio of the component (i) to the component (ii) is less than 2:98, the impact strength and flexibility of the mandrel are unpreferably poor. Contrary to this, when the ratio of the component (i) to the component (ii) is more than 70:30, the resultant mandrel has poor heat resistance, releasability, dimensional stability, and durability.

The blending of the components (i) and (ii) can be carried out in any conventional manner, for example, by using a V-blender, ribbon blender, Henschel mixer, or tumbler blender. Furthermore, the mixing can be carried out by, after blending the components (i) and (ii) in the above-mentioned blender, granulating by means of an extruder, or by melt mixing in, for example, a single-worm extruder, dual-worm extruder, kneader, or Banbury mixer, followed by granuating or crushing.

The 4-methyl-1-pentene polymer compositions may contain various ingredients conventionally added to polyolefins, such as a weathering stabilizer, heat stabilizer, slip agent, nucleating agent, pigment and dye, so long as the desired properties of the present invention are not adversely affected.

Furthermore, 5 parts by weight or less, based on 100 parts by weight of the 4-methyl-1-pentene polymers, of polymers or copolymers of at least one $C_2$ to $C_{20}$ alpha-olefin, other than 4-methyl-1-pentene polymer, may be added to the compositions.

The mandrel according to the present invention can be readily prepared from the above-mentioned compositions by a conventional extrusion molding method as shown in FIG. 1. Although the shapes of the mandrels are determined depending upon those of the desired rubber hoses, the mandrels according to the present invention are generally in the shape of a pipe or a rod. The typical size of a mandrel in the shape of a pipe or rod is 5 to 100 mm$\phi$×110 to 1000 mL.

EXAMPLES

The present invention will now be further illustrated by, but is by no means limited to, the following Examples.

REFERENCE EXAMPLE 1

The ethylene-alpha-olefin random copolymers used in the following Examples were prepared as follows:

(1) Preparation of Ethylene-Propylene Random Copolymer

Ethylene-propylene random copolymer was continuously prepared by using a 4 liter glass reactor provided with an agitator. That is, 2 l/hr of hexane, 1 l/hr of a 16 mmol/l vanadyl trichloride in hexane solution, and 1 l/hr of a 96 mmol/l ethylaluminum sesquichloride in hexane solution were continuously fed to the reactor from the top thereof, while the reaction mixture was withdrawn from the bottom of the reactor so as to maintain the amount of the reaction mixture in the reactor to 2 liters.

On the other hand, a gas mixture of 44 l/hr of ethylene, 41 l/hr of propylene, and 220 l/hr of hydrogen was added to the reactor from the top of the reactor. The reaction temperature was controlled to 35° C. by circulating warm water through a jacket provided outside the reactor.

A small amount of methanol was added to the reaction mixture withdrawn from the bottom of the reactor to thereby stop the reaction. The reaction mixture was washed three times with water. The reaction mixture thus washed was then distilled under the conditions of a reduced pressure of 0.1 mmHg and a pot temperature of 100° C. to remove the hexane solvent and the low-boiling point products. Thus, the desired ethylene-propylene random copolymer was obtained.

The resultant ethylene-propylene random copolymer was subjected to various determination analyses. The ethylene content determined by a $^{13}$C-NMR method was 54 mol %. The Mn and Mw/Mn determined by gel permeation chromatography were 450 and 1.8, respectively. Furthermore, no melting point was observed by a differential scanning calorimeter, the fusion energy determined by a differential scanning calorimeter was 0 cal/g, and the crystallinity index based on X-ray determination was 0%.

(2) Preparation of Ethylene-1-Decene Random Copolymer

The ethylene-1-decene random copolymer was prepared in the same manner as in the production of the ethylene-propylene random copolymer, except that 1-decene was used in lieu of the propylene.

The ethylene-1-decene random copolymer thus prepared had an ethylene content of 40 mol %, an Mn of 560, an Mw/Mn of 1.7, a fusion energy of 0 cal/g, and a degree of crystallinity, based on X-ray determination, of 0%. Furthermore, no melting point was found.

REFERENCE EXAMPLE 2

The ethylene-propylene random copolymer used in the following Examples was prepared as follows:

That is, ethylene-propylene random copolymer was batchwise prepared by using a 2 liter glass reactor provided with an agitator. A solution of 24 mmol/0.75 liter of ethylene aluminum sesquichloride in hexane was prepared in the reactor. A solution of 4 mmol/0.25 liter of vanadyl trichloride in hexane was dropwise added to the reactor through a dropping funnel from the top of the reactor, while a gas mixture of 50 l/hr of ethylene, 60 l/hr of propylene, and 140 l/hr of hydrogen was charged to the reactor. The reaction temperature was adjusted to 35° C. A small amount of methanol was added to the reactor from the top of the reactor 30 minutes after the start of the reaction to stop the reaction.

The reaction mixture was washed three times with water. The resultant reaction mixture was then distilled at a temperature of 100° C. under a pressure of 10 mmHg.

The resultant ethylene-propylene random copolymer had an ethylene content of 54 mol %, an Mn of 1800, an Mw/Mn of 9.5, a melting point of 120° C., a fusion energy of 10 cal/g, and a degree of crystallinity, based on ah X-ray determination, of 14%.

REFERENCE EXAMPLE 3

The propylene-1-butene random copolymer used in the following Examples was prepared as follows:

Into a 20 liter stainless steel polymerization reactor provided with agitation blades, the following components (a), (b), and (c) were charged.

Catalyst component (a): A 0.01 mmol amount, based on 1 liter of the reaction mixture, in terms of titanium, of a catalyst prepared by subjecting a mixture of 200 g of anhydrous magnesium chloride, 46 ml of ethyl benzoate, and 30 ml of methyl polysiloxane to a ball milling treatment under a nitrogen atmosphere and, then, suspending the product in titanium tetrachloride, followed by filtration.

Component (b): A 1.0 mmol amount, based on 1 liter of the reaction mixture, of triethyl aluminum.

Electron donor (c): A 0.33 mmol amount, based on 1 liter of the reaction mixture, of methyl p-toluylate.

As a polymerization solvent, n-heptane was used and a gas mixture of 68 mol % of propylene and 38 mol % of 1-butene was charged at a rate of 4 kl/hr into the reactor. The copolymerization was carried out at a temperature of 70° C.

The resultant propylene-1-butene random copolymer ("PBC" hereinbelow) had a propylene content, determined by a $^{13}$C-NMR method, of 71.0 mol %, a softening point of 110° C., a fusion heat amount of 50 Joule/g, and a melt flow rate of 7.0 g/10 min.

EXAMPLE 1

A 90 parts by weight amount of a crystalline 4-methyl-1-pentene polymer having a density of 0.835 g/cm$^3$, determined according to ASTM-D-1505, an intrinsic viscosity a [η] of 6.2 dl/g determined at 135° C. in decalin, and a 1-decene content of 6 mol % was mixed with 10 parts by weight of squalane in a Henschel mixer. The powdered mixture was allowed to stand at a temperature of 80° C. for 2 hours under a nitrogen gas stream in an oven. The squalane was absorbed into the powdered mixture to obtain the powdered mixture having a good flowability.

The powdered mixture was melt mixed at a temperature of 280° C. in a 20 mmφ extruder and was then molded at a temperature of 270° C. under a pressure of 5 minutes in a pressing machine to obtain sheets having a thickness of 1 mm or 2 mm.

The sheets thus obtained were subjected to the following tests. The results are shown in Table 1.

First modulus (kg/cm) (FM): determined according to ASTM-D-638 by using a 1 mm thick press sheet Bleedout properties (BL): A 1 mm thick press sheet was allowed to stand at a temperature of 50° C. for 48 hours in an oven. The resultant sheet was evaluated by a feel test according to the following criteria:
o . . . No sticky feeling
x . . . Sticky feeling Tensile elongation at break (EL) (%): determined according to ASTM-D-638 by using a 2 mm thick press sheet Durability: A 2 mm thick sheet was sandwiched between unvulcanized sheets having the following composition.

| Composition of Unvulcanized Rubber Sheet | Parts by weight |
| --- | --- |
| Ethylene-propylene terpolymer | 100 |
| Paraffinic oil | 100 |
| Carbon | 150 |
| Defoaming agent | 5 |
| Zinc oxide | 5 |
| Stearic acid | 1 |
| Vulcanizing accelerator | 2.5 |
| Sulfur | 0.5 |

The assembled rubber was vulcanized under a pressure of 100 kg/cm$^2$ (Gauge) at a temperature of 160° C. for 30 minutes in a hot press. After vulcanization, the sheet was taken out from the press and the rubber sheet was released from the pressed sheet. Then, the visual appearance, the dimension stability, the tensile elongation at break, and the releasability of the rubber sheet were evaluated.

This test operation was repeated 10 times by using the same pressed sheet. The results at the first, fourth, and 10 times are shown in Table 1.

The dimensional stability (L) (%) was represented by a shrinkage of a 2 mm thick press sheet.

The releasability was visually determined according to the following criteria with naked eye and feel when the vulcanized rubber sheet was released:
o . . . Cleanly released without any resistance
Δ . . . Difficult to be released due to some resistance
x . . . Not cleanly released due to sticking

EXAMPLE 2

This Example was carried out in the same manner as in Example 1, except that the amounts of the crystalline 4-methyl-1-pentene polymer and the squalane was changed to 80 parts by weight and 20 parts by weight, respectively.

The results are shown in Table 1.

EXAMPLE 3

This Example was carried out in the same manner as in Example 1, except that the ethylene-propylene random copolymer of Reference Example 1 was used in lieu of the squalane.

EXAMPLE 6

This Example was carried out in the same manner as in Example 1, except that the ethylene-propylene random copolymer of Reference Example 2 was used in lieu of the squalane.

The results are shown in Table 1.

EXAMPLE 7

A 20 parts by weight amount of the propylene-1butene random copolymer obtained in Reference Example 3 was mixed with 80 parts by weight of the 4-methyl-1pentene polymer used in Example 1 in a Henschel mixer. The resultant sample was melt mixed at a temperature of 280° C. in a 40 mmφ extruder and press molded at a temperature of 270° C. for 5 minutes under pressure to form a press sheet having a thickness of 1 mm or 2 mm.

These sheets were tested in the same manner as in Example 1. The results are shown in Table 1.

TABLE 1

| Example No. | | Initial | | | First time | | | | Fourth time | | | | Tenth time | | | |
|---|---|---|---|---|---|---|---|---|---|---|---|---|---|---|---|---|
| | FM | EL | BL | L | ΔEL | Appearance | Releasability | L | ΔEL | Appearance | Releasability | L | ΔEL | Appearance | Releasability |
| Example 1 | 1900 | 160 | o | 0 | 0 | No change | o | 0 | 5 | No change | o | 3 | 5 | Pale brown | o |
| " 2 | 1000 | 190 | o | 1 | 0 | " | o | 3 | 8 | " | o | 5 | 10 | " | o |
| " 3 | 2000 | 140 | o | 0 | 0 | " | o | 0 | 5 | " | o | 2 | 5 | " | o |
| " 4 | 2000 | 140 | o | 0 | 0 | " | o | 0 | 5 | " | o | 2 | 5 | " | o |
| " 5 | 1900 | 150 | o | 0 | 0 | " | o | 0 | 5 | " | o | 3 | 5 | " | o |
| " 6 | 2000 | 130 | o | 0 | 0 | " | o | 1 | 5 | " | o | 0 | 10 | " | o |
| " 7 | 4500 | 130 | o | 0 | 0 | " | o | 0 | 3 | " | o | 2 | 6 | " | o |
| Comparative Example 1 | 9500 | 220 | o | 2 | 10 | Dark brown | o | 7 | 25 | Discoloration Bleedout | Δ | 15 | 40 | Discoloration Bleedout | x |
| Comparative Example 2 | 5000 | 120 | — | 0 | 0 | No change | o | 0 | 3 | No change | o | 4 | 5 | Pale brown | o |

The results are shown in Table 1.

EXAMPLE 4

This Example was carried out in the same manner as in Example 1, except that the ethylene-1-decene random copolymer of Reference Example 1 was used in lieu of the squalane.

The results are shown in Table 1.

EXAMPLE 5

This Example was carried out in the same manner as in Example 1, except that hydrogenated isoprene oligomer having an Mn of 550 and an Mw/Mn of 1.2 was used in lieu of the squalane.

The results are shown in Table 1.

COMPARATIVE EXAMPLE 1

Nylon-6 (CM 1011 available from Toray Inc.) was press molded at a temperature of 250° C. for 5 minutes under pressure to obtain a press sheet having a thickness of 1 mm or 2 mm.

The resultant sheets were tested in the same manner as in Example 1. The results are shown in Table 1.

COMPARATIVE EXAMPLE 2

This Comparative Example was carried out in the same manner as in Example 1, except that no squalane was used.

The results are shown in Table 1.

As is clear from the results shown in Table 1, the mandrel made of nylon-6 in Comparative Example 1 had a large initial modulus and an insufficient flexibility. The dimensional stability and, after repeated use, the tensile elongation at break were unpreferably decreased and the releasability also became worse. Contrary to this, the mandrels according to the present invention had a small initial modulus and excellent flexibility and, even after the repeated use, the initial characteristics of the dimensional stability, the tensile elongation at break, and the releasability were stably maintained.

EXAMPLE 8

The 4-methyl-1-pentene polymer used in Example 1, the ethylene-propylene random copolymer of Reference Example 1, and a phenol type stabilizer (Irganox 1010 available from Ciba-Geigy Co.) were mixed at a weight ratio of 90:10:0.2 in a Henschel mixer.

From this compounded mixture, a mandrel having a diameter of 19 mm and a length of 130 m was manufactured by using a 40 mmφ extruder having an L/D ratio of 22 and provided with a die, a sizing, and a cooling device. The extrusion conditions were as follows:
Cylinder temperature(°C.): $C_1/C_2/C_3/H/D = 270/250/250/250/250$
Screw rotation number: 30 to 50 rpm The mandrel thus obtained was coated at a thickness of 3 mm with an unvulcanized rubber compound having the following composition by using a 65 mmφ rubber extruder. The extrusion conditions were as follows:
Cylinder temperature(°C.): $C_1/C_2/D = 80/100/100$ Screw rotation number: 40 rpm

| Composition | Parts by weight |
|---|---|
| Ethylene-propylene terpolymer | 100 |
| Paraffinic oil | 100 |
| Carbon | 150 |
| Defoaming agent | 5 |
| Zinc oxide | 5 |
| Stearic acid | 1 |
| Vulcanizing accelerator | 2.5 |
| Sulfur | 0.5 |

The unvulcanized rubber coated mandrel was further coated at a thickness of 1 mm with lead. The resultant product was wound up and was vulcanized at a temperature of 150° C. for 1 hour in a vulcanizer. After the vulcanization, the vulcanizate was cooled and the mandrel was removed from the vulcanized rubber hose by applying compressed air (8 kg/cm$^2$G) to the mandrel through one end of the vulcanized rubber hose. Thus, the desired rubber hose was produced.

The mandrel was repeatedly used a further 30 times for producing the rubber hose as mentioned above. However, no substantial change in the outer diameter of the mandrel was observed.

As mentioned hereinabove, according to the present invention, the following advantageous features can be obtained.

1. Since the present mandrel is flexible, the mandrel can be readily wound-up and, therefore, the production line is minimized when a long rubber hose is to be produced.

2. Since the present mandrel has high heat resistance, the deformation and the decrease in the properties of the mandrel are not caused when the unvulcanized rubber hose is vulcanized at a high temperature (e.g., 130° C. to 180° C.). Thus, the present mandrel can be repeatedly used many times.

3. The present mandrel has excellent properties sufficient to resist the gas generated from the rubber during the vulcanization and the additives.

4. Since the present mandrel has improved releasability, the mandrel can be readily withdrawn from the vulcanized rubber hose.

We claim:

1. A method of producing a rubber hose comprising the steps of:
   (a) applying unvulcanized rubber on a mandrel said mandrel formed from a composition comprising:
      (i) at least one ethylene-alpha-olefin random oligomer-like copolymer having an ethylene content of 40 to 95 mole % and a degree of crystallinity, based on X-ray determination, of 0 to 20%, wherein the number-average molecular weight of the random oligomer-like copolymer is within the range of from 300 to 5,000, and
      (ii) 4-methyl-1-pentene polymer, wherein the weight ratio of the component (i) to the component (ii) is from 2:98 to 70:30;
   (b) coating said unvulcanized rubber on said mandrel with a cover material;
   (c) rolling up said mandrel together with said unvulcanized rubber and the cover material to obtain an unvulcanized rubber assemble;
   (d) vulcanizing the unvulcanized rubber assemble by heating in a vulcanization apparatus;
   (e) removing the cover material from the resultant vulcanized product; and
   (f) pulling out the mandrel from the resultant vulcanized rubber hose product.

2. The method of claim 1, wherein the carbon number of the alpha-olefin in the random copolymer is 3 to 10.

3. The method of claim 1, wherein the 4-methyl-1-pentene polymer is the homopolymer or 4-methyl-1-pentene or the copolymer of 4-methyl-1-pentene with at least one alpha-olefin having 2 to 20 carbon atoms.

4. The method of claim 1, wherein the alpha-olefin suitable for use as a comonomer in the preparation of the ethylene-alpha-olefin is propylene.

5. The method of claim 1, wherein the ratio of the weight-average molecular weight to the number-average molecular weight of the oligomer-like copolymer is 3 or less.

6. The method of claim 1 wherein step (a) of applying unvulcanized rubber is by melt-coating an unvulcanized rubber on a mandrel.

7. The method of claim 1 wherein step (a) of applying unvulcanized rubber is by winding an unvulcanized rubber sheet on a mandrel.

* * * * *